United States Patent [19]
Gooding et al.

[11] 3,986,015
[45] Oct. 12, 1976

[54] ARITHMETIC UNIT FOR USE IN A DIGITAL DATA PROCESSOR AND HAVING AN IMPROVED SYSTEM FOR PARITY CHECK BIT GENERATION AND ERROR DETECTION

[75] Inventors: David N. Gooding, Endicott; Everett M. Shimp, Endwell, both of N.Y.

[73] Assignee: International Business Machines Corporation, Armonk, N.Y.

[22] Filed: June 23, 1975

[21] Appl. No.: 589,298

[52] U.S. Cl. .................. 235/153 BB; 235/153 BN; 340/146.1 AG
[51] Int. Cl.[2] .................. G06F 11/10; H04L 1/10; H03K 13/34
[58] Field of Search ............... 235/153 BB, 153 BN; 340/146.1 AG

[56] References Cited
UNITED STATES PATENTS

| | | | |
|---|---|---|---|
| 3,051,387 | 8/1962 | Pomerene et al. | 235/153 BN |
| 3,235,854 | 2/1966 | Nugent | 340/146.1 AG X |
| 3,287,546 | 11/1966 | Geller | 235/153 BB |
| 3,300,625 | 1/1967 | Deng et al. | 235/153 BB |
| 3,342,983 | 9/1967 | Pitkowsky | 235/153 BB |
| 3,596,072 | 7/1971 | Iwamoto | 235/153 BB |

OTHER PUBLICATIONS

Dellacato, F. C. *Simplified Parity Check Circuitry* in IBM Tech. Disc. Bull. 3(11): pp. 25–26, Apr. 1961.

*Primary Examiner*—R. Stephen Dildine, Jr.
*Attorney, Agent, or Firm*—Richard E. Bee

[57] ABSTRACT

A digital arithmetic unit employing a binary adder for adding and subtracting multidigit binary coded decimal numbers in either zoned format or packed format and having an improved method of generating parity check bits for the resultant data bytes produced by the arithmetic unit. When using a binary adder for adding or subtracting binary coded decimal numbers, it is necessary to correct some of the data appearing at the output of the binary adder in order to obtain the correct results. The parity check bit generating circuitry of the present invention, however, works on the uncorrected data appearing at the output of the adder, but nevertheless produces the proper parity check bits for the corrected data which represents the final output for the arithmetic unit. This reduces the amount of time delay which would otherwise be caused by generating the parity check bits in a conventional manner.

11 Claims, 12 Drawing Figures

| DECIMAL VALUE | HEX DIGIT | BINARY | | |
|---|---|---|---|---|
| 0 | 0 | 0000 | | |
| 1 | 1 | 0001 | | |
| 2 | 2 | 0010 | | |
| 3 | 3 | 0011 | | DECIMAL DIGIT CODES |
| 4 | 4 | 0100 | | |
| 5 | 5 | 0101 | | |
| 6 | 6 | 0110 | | |
| 7 | 7 | 0111 | | |
| 8 | 8 | 1000 | | |
| 9 | 9 | 1001 | | |
| 10 | A | 1010 | + | |
| 11 | B | 1011 | − | |
| 12 | C | 1100 | + | DECIMAL SIGN CODES |
| 13 | D | 1101 | − | |
| 14 | E | 1110 | + | |
| 15 | F | 1111 | + | |

FIG. 3

| S0 | S1 | S2 | P | $\overline{P}$ |
|---|---|---|---|---|
| 0 | 0 | 0 | 1 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | $\overline{DEC}$ | DEC |
| 1 | 1 | 0 | 1 | 0 |
| 1 | 1 | 1 | 0 | 1 |

FIG. 7

| S3 | S7 | MS | R | $\overline{R}$ |
|---|---|---|---|---|
| 0 | 0 | 0 | 1 | 0 |
| 0 | 1 | 0 | 0 | 1 |
| 1 | 0 | 0 | 0 | 1 |
| 1 | 1 | 0 | 1 | 0 |
| 0 | 0 | 1 | 0 | 1 |
| 0 | 1 | 1 | 1 | 0 |
| 1 | 0 | 1 | 1 | 0 |
| 1 | 1 | 1 | 0 | 1 |

FIG. 9

| INPUT | | ADDER OUTPUT | | | | CORRECTOR OUTPUT | | | |
|---|---|---|---|---|---|---|---|---|---|
| A + B | | A+B+6 | | | | | | | |
| DEC (1) | HEX (2) | CARRY (3) | DIGIT (4) | BINARY (5) | P (6) | CORR (7) | HEX OUT (8) | BINARY (9) | P (10) |
| 0 | 0 | 0 | 6 | 0110 | 1 | −6 | 0 | 0000 | 1 |
| 1 | 1 | 0 | 7 | 0111 | 0 | −6 | 1 | 0001 | 0 |
| 2 | 2 | 0 | 8 | 1000 | 0 | −6 | 2 | 0010 | 0 |
| 3 | 3 | 0 | 9 | 1001 | 1 | −6 | 3 | 0011 | 1 |
| 4 | 4 | 0 | A | 1010 | 1 | −6 | 4 | 0100 | 0 |
| 5 | 5 | 0 | B | 1011 | 0 | −6 | 5 | 0101 | 1 |
| 6 | 6 | 0 | C | 1100 | 1 | −6 | 6 | 0110 | 1 |
| 7 | 7 | 0 | D | 1101 | 0 | −6 | 7 | 0111 | 0 |
| 8 | 8 | 0 | E | 1110 | 0 | −6 | 8 | 1000 | 0 |
| 9 | 9 | 0 | F | 1111 | 1 | −6 | 9 | 1001 | 1 |
| 10 | A | 1 | 0 | 0000 | 1 | 0 | 0 | 0000 | 1 |
| 11 | B | 1 | 1 | 0001 | 0 | 0 | 1 | 0001 | 0 |
| 12 | C | 1 | 2 | 0010 | 0 | 0 | 2 | 0010 | 0 |
| 13 | D | 1 | 3 | 0011 | 1 | 0 | 3 | 0011 | 1 |
| 14 | E | 1 | 4 | 0100 | 0 | 0 | 4 | 0100 | 0 |
| 15 | F | 1 | 5 | 0101 | 1 | 0 | 5 | 0101 | 1 |
| 16 | 10 | 1 | 6 | 0110 | 1 | 0 | 6 | 0110 | 1 |
| 17 | 11 | 1 | 7 | 0111 | 0 | 0 | 7 | 0111 | 0 |
| 18 | 12 | 1 | 8 | 1000 | 0 | 0 | 8 | 1000 | 0 |
| 19 | 13 | 1 | 9 | 1001 | 1 | 0 | 9 | 1001 | 1 |

| P | Q | R | ZP |
|---|---|---|----|
| 0 | 0 | 0 | 0  |
| 0 | 0 | 1 | 1  |
| 0 | 1 | 0 | 1  |
| 0 | 1 | 1 | 0  |
| 1 | 0 | 0 | 1  |
| 1 | 0 | 1 | 0  |
| 1 | 1 | 0 | 0  |
| 1 | 1 | 1 | 1  |

ARITHMETIC UNIT FOR USE IN A DIGITAL DATA PROCESSOR AND HAVING AN IMPROVED SYSTEM FOR PARITY CHECK BIT GENERATION AND ERROR DETECTION

CROSS-REFERENCE TO RELATED APPLICATION

The representative embodiment of the invention described in the present application is specifically tailored for use in the arithmetic unit described in considerable detail in copending United States patent application Ser. No. 587,797, filed June 17, 1975, and entitled "Arithmetic Unit for a Digital Data Processor," the applicants and assignee for this copending application being the same as for the present application. The present application describes in a general manner the arithmetic unit of the copending application. For additional details concerning such arithmetic unit, reference should be made to the copending application. The description set forth in such copending application is hereby incorporated in the present application by this reference thereto.

BACKGROUND AND SUMMARY OF THE INVENTION

This invention relates to arithmetic units for use in digital computers and digital data processors for adding and subtracting binary coded decimal numbers.

The present invention is concerned with the processing of numerical data represented by sequences of binary digits or bits. In the described embodiment, the data bits in these binary bit sequences are grouped into 8 bit groups and each such 8 bit group is called a "byte." For purposes of detecting the occurrence of erroneous data, a parity check bit is associated with each 8 bit data byte during various portions of the journey of the data bytes through the data processing machine. Where odd parity checking is used, the value of the parity check bit is assigned so as to give the overall 9 bit combination formed by the 8 data bits and the one parity check bit and odd number of binary 1 level bits. If, on the other hand, even parity checking is used, the parity check bit is set so as to cause the overall 9 bit combination to have an even number of binary 1 level bits. A parity check is performed at various places in the data processor by detecting the number of 1 level bits in each 9 bit combination. If odd parity is being used and an even number of 1 bits are detected, then that piece of data is known to contain an error and the appropriate error-handling routine can be called into play. The same considerations apply where even parity is being used and an odd number of 1 bits is detected.

At certain points in a data processor, the data bits must be separated from the check bits and processed by themselves. An example of this occurs in the case of a binary adder in an arithmetic unit. In such case, only the data bits for the two numbers to be added are supplied to the adder and new parity check bits must be generated for the resultant data bits appearing at the output of the adder. This can and has been done for arithmetic units which handle purely binary data by locating the appropriate parity check bit generating circuitry at the output of the binary adder to generate the desired parity check bits and then combining these check bits with the appropriate ones of the resultant data bit groups. This, however, introduces a significant time delay into the movement of the data through the arithmetic unit. The arithmetic unit must sit and wait for the parity generator to generate the check bits.

It has been heretofore proposed to eliminate or substantially reduce this undesired time delay by using various so-called "parity prediction" techniques. One such proposal suggests the use of parity predictor circuitry which looks at the data bits in the two numbers or operands supplied to the adder and calculates the appropriate parity check bit or bits that will be needed for the result data bits which will appear at the output of the adder. This parity calculation is performed in parallel with and at the same time as the arithmetic operation in the adder. Thus, the appropriate check bits become available at the same time that the result data bits become available. Thus, no time is lost waiting for the parity bits to be generated.

Such previous parity prediction proposals are, unfortunately, not entirely suitable for use in the case of an arithmetic unit which is constructed so as to be able to process binary coded decimal data in zoned or packed format. In the case of zoned decimal data, for example, the data includes more than just numerical digit data. The operands supplied to the arithmetic unit include zone fields as well as digit fields. Also, both zoned decimal and packed decimal operands include a 4 bit sign field which is coded to indicate the polarity or sign of the numerical value represented by the digit fields in the operand. Both of these factors, namely, the presence of zone fields and sign fields, complicate the processing of the decimal data. It requires that the data be given special preconditioning treatment as it enters the arithmetic unit and special postconditioning treatment as it leaves the arithmetic unit. Also, decimal data is processed in binary coded decimal form. Thus, the data being processed is in a base 10 number system, while the binary circuits which handle the binary coded data operate in accordance with the hexadecimal or base 16 number system. This further complicates the processing of the data and requires further special treatment of the data as it enters and leaves the arithmetic unit.

The previously proposed parity prediction techniques of which applicants are presently aware, do not appear to cover these added complications for decimal type data. They appear to relate to the handling of purely binary numbers. They do not appear to be readily applicable to the problems encountered in an arithmetic unit which handles binary coded decimal numbers in zoned or packed format. The present invention, on the other hand, provides a solution to this parity generation problem for the case of such binary coded decimal data. Thus, the present invention fills an important gap that does not appear to be covered by previous proposals.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings.

DESCRIPTION OF THE PREFERRED EMBODIMENTS

Figure 1:
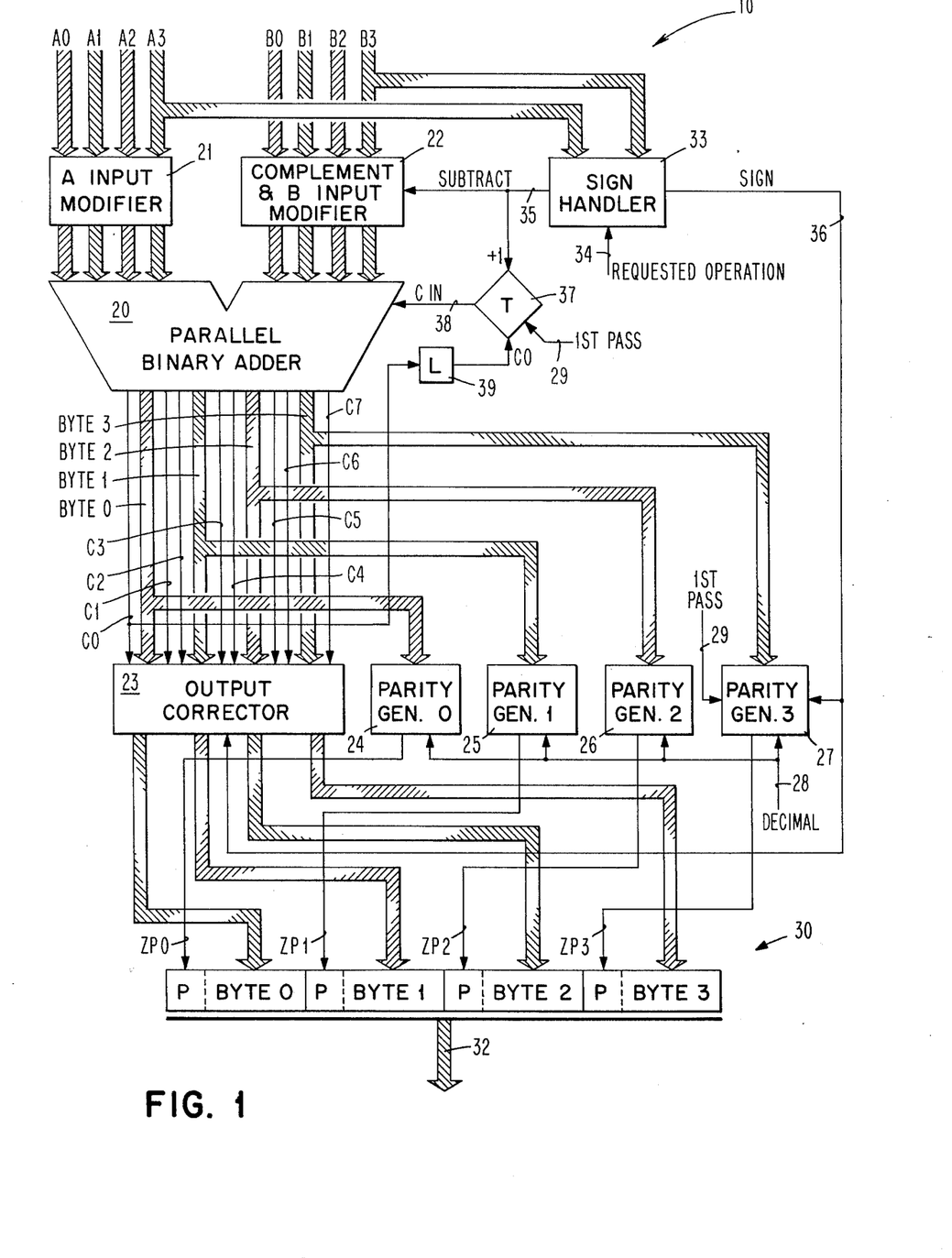
FIG. 1 is a functional block diagram of an arithmetic unit for use in a digital data processor and having parity check bit generating circuitry constructed in accordance with the present invention.
Figure 2:
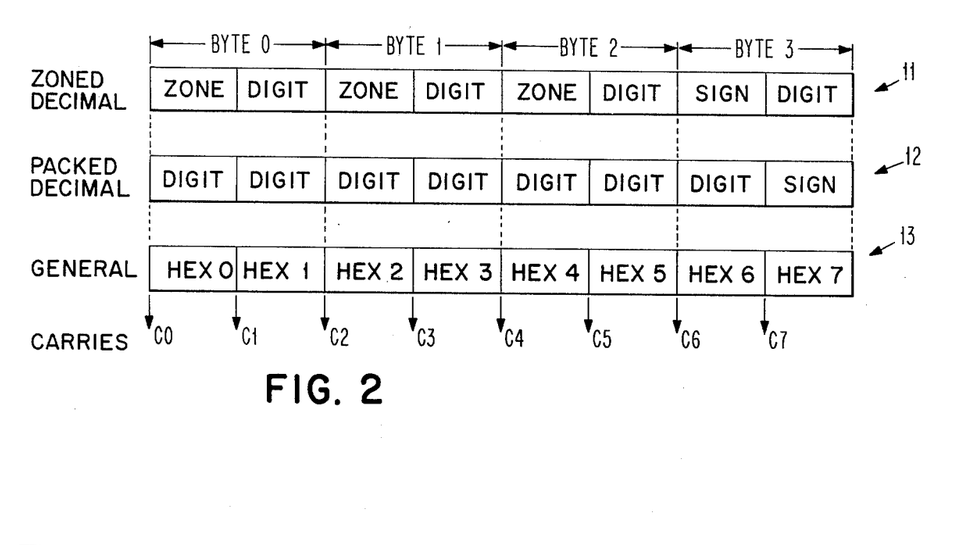
FIG. 2 is a diagram showing some of the data formats handled by the arithmetic unit of FIG. 1.

Referring to FIG. 1, there is shown an arithmetic unit 10 which is capable of performing arithmetic operations, namely, addition and subtraction operations, on binary coded decimal numbers in either zoned or packed format, as well as on purely binary numbers. The data formats for the zoned decimal and packed decimal numbers is shown in FIG. 2, the zoned format being indicated at 11 and the packed format being indicated at 12. A more general way of describing the incoming data is indicated at 13. For sake of an example, it is assumed that the arithmetic unit 10 of FIG. 1 has a data flow width of 4 bytes and that each byte is composed of 8 data bits. A 9 bit, called a parity check bit, is associated with each byte except when the bytes are in the arithmetic unit portion of the data flow. These parity check bits are not represented in FIG. 2. FIG. 2 shows only data bits.

As indicated by the general representation at 13, it is convenient to think of each 8 bit byte as being composed of two 4 bit hexadecimal or "hex" fields. The terms "hexadecimal" and "hex" refer to the base 16 number system and denote the fact that a group of 4 binary bits can be coded to cover a range of 16 different numerical values.

The order of significance of the bits, bytes and hex fields in FIG. 2 increases from right to left, byte 0 being the highest order or most significant byte shown in FIG. 2 and byte 3 being the lowest order or least significant byte. Similarly, hex field 0 is the highest order hex field shown in FIG. 2 and hex field 7 is the lowest order hex field. These numerical designations are, of course, for purposes of describing the hardware and not necessarily the data being processed. In particular, the numbers or operands being processed can have widths greater than four bytes. In such cases, the additional bytes are processed during subsequent passes through the arithmetic unit 10.

As indicated at 11, numerical data in the zoned decimal format is comprised of alternate 4 bit zone fields and 4 bit digit fields with the lowest order zone field (hex 6 field) being a sign field which is coded to indicate whether the number is a positive or a negative number. The zone code for all zone fields, other than the sign field, will be assumed to be 1111, this being the proper zone code for numerical data encoded in accordance with the Extended Binary Coded Decimal Interchange Code (EBCDIC) which is in widespread present day use. Each 4 bit digit field represents 1 binary coded decimal digit. The coding for these digit fields is indicated by the first ten entries in the chart of FIG. 3. One or more of the last six entries (hex digits A-F) are used to provide the coding for the sign field. For present purposes, it will be assumed that the binary codes for hex digits A, C, E and F are used to denote a positive or plus sign, while the binary codes for hex digits B and D are used to denote the negative or minus sign.

Figure 3:
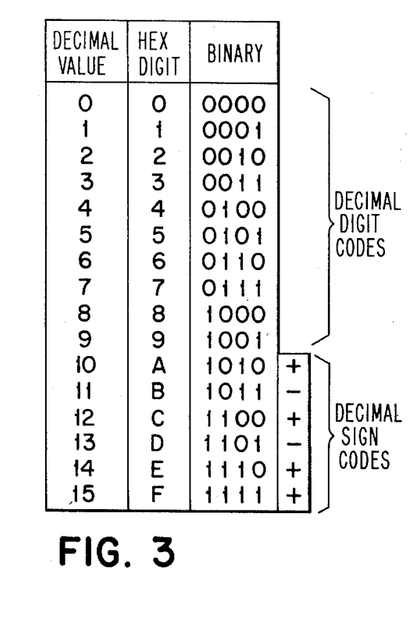
FIG. 3 is a chart showing the binary coding used for the binary coded decimal data handled by the FIG. 1 arithmetic unit.

As indicated at 12, packed decimal operands are comprised entirely of 4 bit digit fields except that the lowest order 4 bit field (hex field 7) is used as the sign field. The coding of these digit and sign fields is the same as that for the zoned decimal case and is also represented by the chart of FIG. 3.

The carry signals C0–C7 indicated in FIG. 2 denote the carries generated inside a binary adder when adding two input operands. Thus, for example, the C5 carry denotes the carry signal passing from the highest order bit stage in hex field 5 to the lowest order bit stage in hex field 4 when two operands are being added. For sake of example, it is assumed that C5 = 1 denotes the occurrence of a carry-out from the hex 5 field into the hex 4 field, while C5 = 0 denotes the absence of a carry. In the case where a binary subtractor is used instead of a binary adder, the carry signals would instead be "borrow" signals.

Referring to FIG. 1, the arithmetic unit 10 there shown includes binary arithmetic circuitry for arithmetically combining 2 binary data bit sequences. In the illustrated embodiment, this arithmetic circuitry is comprised of a parallel binary adder 20 for adding two input binary bit sequences. For high speed operations, the adder 20 is preferably of the carry look-ahead type. In any event, the adder 20 is of a straightforward type suitable for handling pure binary numbers and having no special provisions for accommodating either zoned decimal or packed decimal numbers. For the assumed case of a data flow width of four bytes, the adder 20 includes 32 bit handling stages and is capable of adding a first 32 bit input operand to a second 32 bit input operand and producing an output result having a width of 32 bits.

As an alternative embodiment, a parallel binary subtractor can be used in place of the parallel binary adder 20. For high speed operations, such subtractor should preferably be of the borrow look-ahead type. Unless otherwise mentioned, it will be assumed that the binary arithmetic circuitry being discussed herein is the parallel binary adder 20 shown in FIG. 1.

The arithmetic unit 10 further includes input preconditioning circuitry for receiving two 32 bit data sequences, preconditioning same and supplying the preconditioned data bit sequences to the two input sides of the binary adder 20. The preconditioning circuitry includes an A input modifier 21 for receiving a first 4 byte operand, preconditioning same and supplying the preconditioned operand to the left side or A side input of the binary adder 20. The eight-conductor input data buses for the four A side input bytes are labeled A0–A3. The input preconditioning circuitry also includes a complement and B input modifier 22 for receiving a second 4 byte operand, preconditioning same and supplying the preconditioned operand to the right side or B side input of the binary adder 20. The eight-conductor input data buses for the four B side input bytes are labeled B0–B3.

The arithmetic unit 10 further includes output modifier circuitry or output correction circuitry, represented by an output corrector 23, for receiving the resultant data bit sequence produced by the binary adder 20 and correcting the bits therein, where necessary, to offset any undesired effects introduced by the preconditioning and arithmetic combining operations performed in units 20–22.

The arithmetic unit 10 further includes parity check bit generating circuitry coupled to the output of the binary adder 20 and responsive to the resultant uncorrected data bit sequence produced by the binary adder 20 for generating one parity check bit for each data byte appearing at the output of the binary adder 20. This parity check bit generating circuitry includes four separate parity check bit generators 24–27 for individually generating the parity check bits for the different ones of the 4 data bytes.

As will be seen, each of the parity generators 24–27 includes therein control circuitry responsive to the occurrence of one or more external control signals for inverting the binary value of the generated parity check bit for certain predetermined binary code combinations for the 8 bit data byte supplied to such parity generator. One of these control signals and one which is supplied to each of the parity generators 24–27 is a "decimal" status signal appearing on a control line 28. An additional "first pass" control signal appears on a control line 29 but is supplied only to the lowest order parity generator 27. The status signals on control lines 28 and 29 are provided by the control section of the data processor. For sake of example, it is assumed that the decimal status signal on line 28 is set to the binary one level when the arithmetic unit 10 is processing decimal data in either zoned or packed format and is set to the binary zero level when the arithmetic unit 10 is processing pure binary or other nondecimal data. Likewise, it is assumed that the first pass status signal on line 29 is set to the binary one level when the arithmetic unit 10 is performing a first pass operation for a given pair of input decimal operands. For a second or subsequent pass with decimal operands or for any pass with nondecimal operands, the control line 29 is set to the binary zero level. As previously indicated, second and subsequent passes are used for the case of larger than hardware width input operands.

The arithmetic unit 10 further includes assembler circuitry for concatenating the corrected data bytes produced by the output corrector 23 with the parity check bits produced by the parity check bit generators 24–27. This assembler circuitry is comprised of a binary register 30 having 36 side-by-side binary bit stages for receiving 36 binary bits in a parallel manner. The 8 corrected data bits for each byte are supplied to a contiguous group of 8 bit stages in the register 30 and the parity check bit for any given byte is supplied to the register bit stage located immediately to the left of the eight stages used by the data bits for that byte. These 36 register stages are connected to different conductors in a 36-conductor output data bus 32.

The arithmetic unit 10 also includes decimal sign handling circuitry located within a sign handler unit 33. This circuitry receives the sign field portions of the two input decimal operands and a "requested operation" signal received from the control section of the data processor by way of control line 34. The sign handler 33 produces on a first output line 35 an add/substract control signal for controlling the arithmetic operation performed by the arithmetic unit 10. The sign handler 33 further produces on a second output line 36 a sign control signal for controlling the coding of the sign field in the resultant number produced by the output corrector 23 when processing decimal data. The sign control signal on line 36 is at the binary one level when the resultant number is to have a negative sign code and is at the binary zero level when the resultant number is to have a positive sign code. The sign control signal on line 36 is also supplied to the byte 3 parity generator 27. The arithmetic unit 10 is caused to perform a subtraction operation by causing the complement and B input modifier 22 to supply the complement of the B side input operand to the right side input of the binary adder 20. For the case where a binary subtractor is used in place of the binary adder 20, a reverse procedure is used. In such case, the B side input operand is complemented to perform an addition and is not complemented when performing a subtraction.

The add/subtract control signal on control line 35 is at the binary one level when a subtract operation is to be executed and is at the binary zero level when an add operation is to be executed. This add/subtract control signal is also supplied to one input of a switching circuit 37 which selects the signal line to be connected to the $C_{in}$ carry-in line 38 which runs to the lowest order bit stage in the adder 20. A latch circuit 39 receives the C0 carry-out signal from the highest order bit stage in the adder 20 and supplies same to the other input of the switch circuit or selector circuit 37 for use during a subsequent arithmetic pass through adder 20. Selector circuit 37 is controlled by the first pass status signal on control line 29. When performing a first pass operation, the add/subtract control line 35 is connected to the adder carry-in line 38 to enable a +1 to be supplied to the carry-in line 38 when executing a subtract operation. On a second or subsequent pass for the case of larger than hardware width operands, switch 37 instead connects the output of latch circuit 39 to the carry-in line 38. This enables the carry-out signal from an earlier pass to be used as the carry-in signal for the next pass.

The internal construction and operation of the A input modifier 21, the complement and B input modifier 22, the output corrector 23 and the sign handler 33 are described in considerable detail in the above cross-referenced and related copending application Ser. No. 587,797. For sake of brevity, these detailed descriptions will not be repeated herein. Only the features of these units 21, 22, 23 and 33 which are pertinent to an understanding of the present invention will be discussed in the present application and even these features will be discussed only in a general or summary manner. It should be noted, however, that various external control signals are supplied to each of units 21, 22, 23 and 33. For simplicity of illustration, the control lines for these control signals are not shown in the present application. Such control lines are shown and described in the cross-referenced copending application. They include, for example, control lines for a zoned/packed status signal, a decimal/not decimal status signal (same as on line 28) and a first pass/subsequent pass status signal (same as on line 29).

Considering first the case where the arithmetic unit 10 is processing pure binary numbers, the A input modifier 21 is set to pass the A side input operand to the left side of the adder 20 without modification. A switching circuit inside the sign handler 33 connects the requested operation line 34 directly to the add/subtract control line 35. If the requested operation is addition, the B side input operand is supplied without modification to the right side input of the adder 20. For subtraction, the complement of the B side input is supplied to the adder 20. The output corrector 23 is set to pass the output of the adder 20 to the output register 30 without modification. Thus, the A and B input modifiers 21 and 22 and the output corrector 23 do not alter the data when handling pure binary numbers.

Considering next the case where the arithmetic unit 10 is performing arithmetic operations on binary coded decimal operands in zoned format, the A input modifier 21 is set to force each of the 4 bits in each of the zone and sign fields to assume a binary value of 0. The digit fields are not modified. The resulting modified zone and sign fields and unmodified digit fields are supplied to the left side input of the adder 20. The B input modifier 22 is set to force each of the four bits in each of the zone and sign fields in the B side input operand to assume a binary value of 1. The sign handler 33 is set to automatically control the complementing action in accordance with the signs of the two input operands and the sign of the requested operation. With respect to the latter, a positive sign value denotes a request for addition and a negative sign value denotes a request for subtraction. If none or an even number of these three polarity factors is negative, the sign handler 33 sends an "add" signal (binary zero) to the B input modifier 22 via control line 35. If an odd number of these three polarity factors is negative, then sign handler 33 sends a "subtract" signal (binary one) to the B input modifier 22. If the signal on line 35 says "add" and the input operands are in a decimal format, then B input modifier 22 operates to increase the value of each binary coded decimal digit (each digit field) by a factor of 6. If the signal on line 35 instead says "subtract" and the input operands are in a decimal format, then the B input modifier does a one's complement operation by inverting the binary value of each bit in each digit field. The thus modified zone, sign and digit fields for the B input operand are then supplied to the right side input of the adder 20.

For the zoned decimal case, the output corrector 23 operates to force each of the 4 bits in each zone field position to assume a binary value of one. The output corrector 23 also operates to set the sign field code to the proper positive or negative polarity value, this selection being controlled by the sign control signal on conductor 36. During normal operation, the sign field in the output corrector 23 is set to indicate the same polarity value as indicated by the sign field in the A side input operand. The output corrector 23 treats the digit fields on an individual basis. Some digit fields may be modified by having their digit values decreased by a factor of 6, while other digit fields may be passed without modification. The choice is determined by the hex field carry-out signal (one of C0–C7 signals) for the particular digit field being considered. Considering, for example, he digit field in hex field 3 position (FIG. 2), if there is no hex field 3 carry-out (C3 = 0), then the digit value is decreased by a factor of 6. Conversely, if a C3 carry-out does occur (C3 = 1), then the digit value is not changed or modified. The resulting zone, sign and digit fields appearing at the output of the output corrector 23 are supplied to the output register 30.

The setting of the zone and sign fields in the A side operand to zero and in the B side operand to one enables the carry-outs produced by the digit fields to be propagated through the zone and sign fields when the two operands are combined inside the adder 20. This feature enables the performance of the arithmetic operations with the operands remaining in a zoned format. The increasing of the digit values by a factor of 6 in the B input modifier 22 is done to take into account the difference between the decimal (base ten) and hexadecimal (base 16) number systems so that a digit field carry-out will be produced when the sum of the two decimal digit values is such as to require a decimal carry to the next higher order digit or, in other words, when the sum of the two decimal digit values is equal to or greater than 10. Without special help (the +6 action), this would not always occur where the addition is performed on a hexadecimal basis, which is the basis on which the adder hardware works. The output corrector 23 operates to restore the proper code for the zone fields, to set the proper sign field code and to correct the digit fields, where necessary, to offset the effect of the +6 action in the B input modifier 22.

The operation of the arithmetic unit 10 when arithmetically combining binary coded decimal numbers in packed format is generally similar to the operation for the zoned decimal format except that, among other things, there are no zone fields to be taken into account. More particularly, when adding or subtracting packed decimal data, the A input modifier 21 forces only the sign field bits to the binary zero level and the B input modifier 22 forces only the sign field bits to the binary one level. Also, this is only done on a first pass operation since the sign fields are present only on the first pass. The digit fields are not modified by the A input modifier 21. The B input modifier 22 provides either the +6 action or the complement action for the B side digit fields in the same manner as for the zoned decimal digit fields. The output corrector 23 sets the packed decimal sign field for the output number in accordance with the status of the sign control signal on line 36. This, of course, is done only for a first pass operation because the sign field occurs only during the first pass. The digit fields are treated by the output corrector 23 in the same manner as were the digit fields in the zoned decimal case.

The foregoing summary of the general operation of the arithmetic unit 10 shows the complexity of the situation when performing arithmetic operations on binary coded decimal numbers. In view of such complexity, it would appear to be extremely difficult, if not impossible, to apply a parity prediction technique for purposes of generating the parity check bits for the resultant binary coded decimal number produced by the arithmetic unit 10. Nevertheless, it would be highly desirable to do so in order to reduce the amount of time delay necessitated by the parity check bit generation process. Applicants have found a way of achieving this desired goal. Not only that, but the goal is achieved with very little increase in circuit cost and complexity.

Considering now the parity check bits, the two operands to be processed will, in most cases, have parity check bits associated therewith. These parity check bits, however, are not supplied to the portion of the arithmetic unit 10 shown in FIG. 1 because they would mess up the addition taking place inside the binary adder 20. Thus, no parity check bit lines are connected to the A and B input modifiers 21 and 22 or to the sign handler 33. It is, however, very desirable to re-establish the parity checking capability for the resultant numbers produced by the arithmetic unit 10. This could, of course, be accomplished by feeding the resultant output data appearing at the output of the output corrector 23 to parity generating circuitry of a known construction and then assembling the generated parity check bits alongside the appropriate corrected data bytes outputted by the output corrector 23. This, however, would introduce at least two stages of delay into the operation of the arithmetic unit 10. In other words, the time required to generate the parity check bits would be equivalent to two stages of delay and the data in the output register 30 would not be ready for use by the remainder of the data processor until after the occurrence of such delay.

Applicants reduce this waiting time or delay time by instead connecting the parity generating circuitry to the output of the binary adder 20, as opposed to the output of the output corrector 23, and by constructing such parity generating circuitry so as to provide a form of parity prediction which will produce the correct results. Considering, for example, that the parity generating circuitry introduces two stages of delay and that the output corrector 23 introduces one stage of delay, the connecting of the parity generator circuitry to the output of the adder 20 reduces the net delay of the parity bits relative to the corrected data bits by a factor corresponding to one stage of delay. These assumed figures are more or less typical. In general, the present invention reduces the delay to one half of what it would otherwise be. Also, the connecting of the parity generating circuitry to the output of adder 20 enables the operation of the output corrector 23 to be parity checked. This would not be possible if the parity generating circuitry were connected to the output of the output corrector 23. This is also an important consideration.

As indicated above, when adding or subtracting decimal data, the data bit sequence appearing at the output of the corrector 23 will frequently be rather different from the data bit sequence appearing at the output of the adder 20. Using hexadecimal notation, a typical example for zoned decimal data is shown in Table I.

TABLE 1

| FORMAT | | | | | | | |
|---|---|---|---|---|---|---|---|
| Zone | Digit | Zone | Digit | Zone | Digit | Sign | Digit |
| ADDER OUTPUT | | | | | | | |
| F | A | 0 | 4 | F | E | 0 | 7 |
| CORRECTOR OUTPUT | | | | | | | |
| F | 4 | F | 4 | F | 8 | F | 7 |

The output of the adder 20 is FA04FE07, whereas the output of the corrector 23 is F4F4F8F7. With respect to the zone fields, the first and third zone fields remain unchanged, while the second and fourth zone fields are changed from zero to F. The fourth zone field is actually a sign field and, in the illustrated case, the positive sign code 1111 is used for the corrector output. With respect to the digit fields, the second and fourth digits remain unchanged, while the first digit is changed from A to 4 and the third digit is changed from E to 8. Thus, there can be a substantial difference between the adder output and the corrector output.

Applicants have discovered a way of taking into account these differences so as to make possible the desired parity prediction action. In explaining how this is done, it is helpful to initially consider the zone, sign and digit fields on an individual basis. Also, for sake of example, it is assumed that the parity check bits to be generated are such as to enable an odd parity check. In such case, the parity check bit must be given a binary value such that the 8 data bits plus the parity check bit for any given byte will have an odd number of 1 bits.

Figure 4:
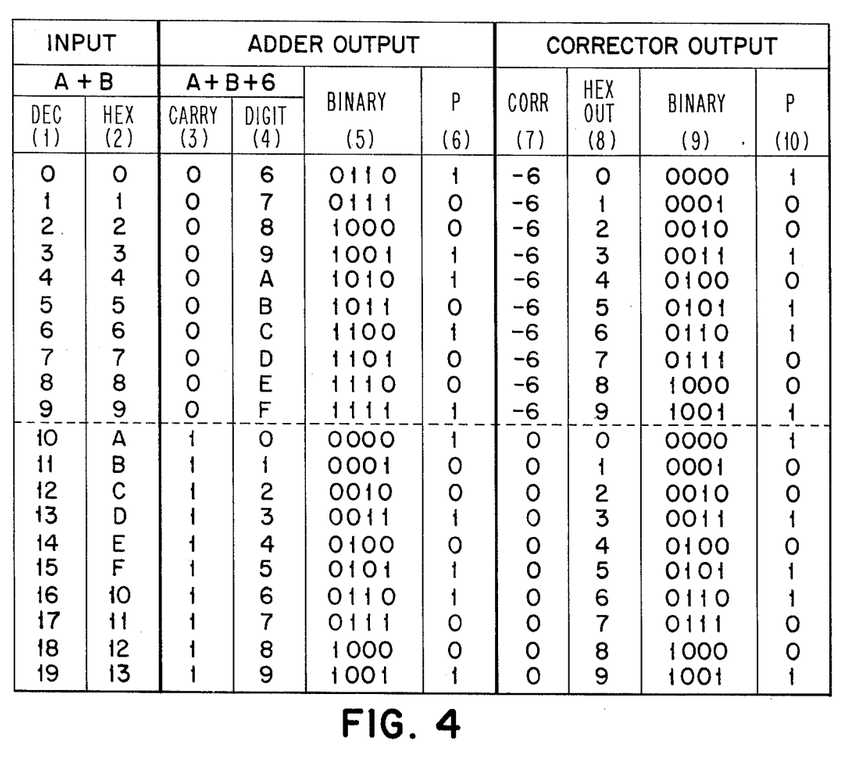
FIG. 4 is a chart used in explaining the operation of the FIG. 1 arithmetic unit.

Considering first the digit fields, the various possibilities that may occur in the arithmetic unit 10 when two binary coded decimal digits are added together are shown in the chart of FIG. 4. Column 1 lists all the various possible results for the sum of two decimal digits A and B. The last entry showing a result of nineteen is obtained when both A and B are equal to nine and there is a carry-in of one from the next lower order digit position. Column 2 shows the hexadecimal equivalents of the entries in column 1. Columns 3 and 4 show what happens when the two input digits are passed through the input modifiers 21 and 22 and added together in the adder 20. As previously indicated, the value of the B side digit is increased by a factor of 6. Columns 3 and 4 use hexadecimal notation. Column 4 shows the resulting digit field appearing at the output of the adder 20. Column 3 shows the carry-out signal produced by this digit field and passed on to the next higher digit position. Column 5 shows the binary equivalents for the entries in column 4. The binary bit patterns shown in column 5 are what actually appear at the output of the adder 20.

As can be seen by comparing columns 1, 3, 4 and 8, no correction is required of the resulting digit field provided that a carry-out was produced (C = 1) for the digit field. If no carry-out occurred (C = 0), then the resultant digit value must be decreased by a factor of six to get the correct answer. This correction occurs inside the output corrector 23. Column 7 shows when the −6 correction is applied and column 8 shows the resulting digit field (in hexadecimal notation) appearing at the output of the corrector 23. Column 9 shows the binary equivalents of the entries in column 8. These bit patterns of column 9 are what actually appear at the output of the corrector 23.

Column 5 shows the actual output of the adder 20 for a given decimal digit field and column 9 shows the resulting output from the corrector 23 for this same given digit field. Column 6 shows the parity check bit values that would be required for the corresponding data bit patterns in column 5 in order to provide the assumed odd parity for 1 hex digit. Column 10 shows the odd parity check bit values that would be required by the corresponding entries in column 9. A careful comparison of columns 6 and 10 will show that there are only two cases where the parity for the corrector output is different from the parity for the adder output. These two cases are the cases where the adder output has a hexadecimal value of either A or B (1010 or 1011). In these hex A and hex B cases, the corrector output parity for the digit field is opposite to that of the adder output parity. Thus, with respect to the digit fields, the parity predicted by looking at the adder output will, in fact, be the desired parity provided that the parity values for hex A and hex B outputs are inverted. Thus, the parity generator must be capable of recognizing the occurrence of these hex A and hex B adder outputs and of inverting the value of the generated parity bit when either of these hex A or hex B adder outputs occur.

For the case of a zone field, the output of adder 20 will be either 0000 or 1111. Both of these possibilities require an odd parity check bit value of one. The zone field appearing at the output of corrector 23 will always have a value of 1111. This also requires an odd parity check bit value of 1. Thus, for the zone fields, the parity predicted by looking at the adder output will always be the correct parity needed by the corrector output. Thus, no parity prediction complications are introduced by the zone fields.

Considering now the case of a sign field, the preconditioning provided by the input modifiers 21 and 22 cause the resulting sign field appearing at the output of adder 20 to have either a 0000 value or a 1111 value, the same as for a zone field. Each of these possibilities calls for an odd parity check bit value of 1. At the output of corrector 23, there are three possibilities. The preferred output sign codes are hexadecimal values C, D and F. F is the preferred positive sign code for zoned decimal data, while C is the preferred positive sign code for packed decimal data. D is the preferred negative sign code for both zoned and packed decimal data. Because of its internal construction, the corrector 23 will output only these threee preferred sign codes. The actual binary bit patterns for these sign codes C, D and F are respectively 1100, 1101 and 1111. The two positive codes C and F call for an odd parity check bit value of 1. This is the same as the odd parity bit value called for by looking at the sign field coming out of the adder 20. The negative sign code D, however, calls for an odd parity check bit value of zero, which is the opposite of the value obtained by looking at the adder output. Thus, the parity generator for the byte which includes the sign field must be capable of inverting the predicted parity whenever the corrector 23 is set to output the negative sign code D. The setting of this output corrector sign code is controlled by the sign control signal on the conductor 36. Thus, this sign control signal can also be used to determine when to invert the predicted parity value generated by the byte 3 parity generator 27, byte 3 being the byte which includes the sign field.

Figure 5:
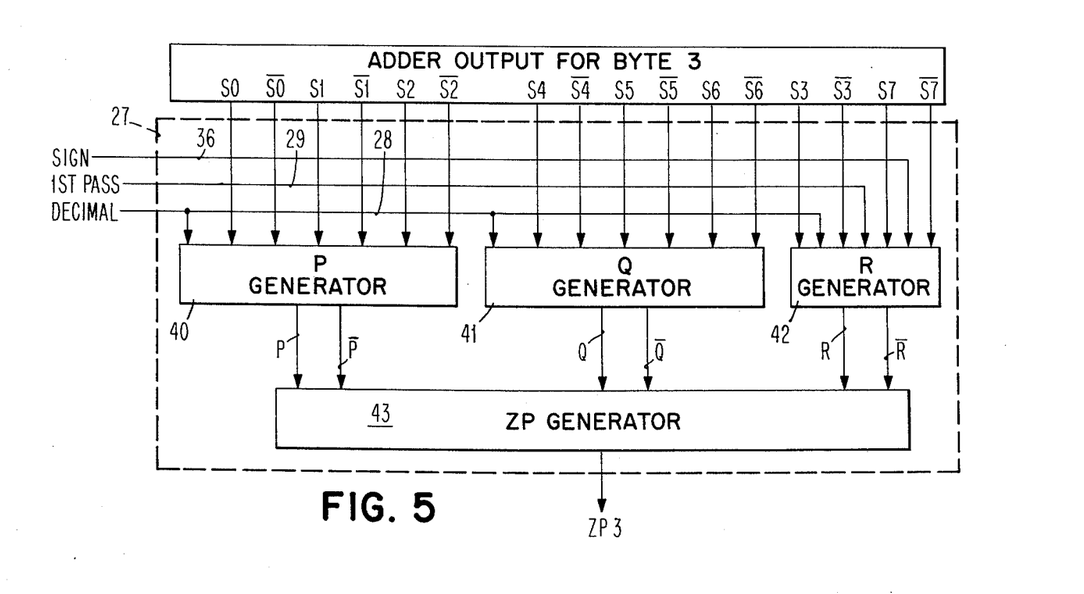
FIG. 5 is a functional block diagram showing a representative form of construction for the byte 3 parity generator of FIG. 1.

Referring now to FIG. 5, there is shown a representative form of internal construction for the byte 3 parity generator 27 of FIG. 1. As indicated in FIG. 5, the adder output bit lines used by the parity generator 27 are designated as S0–S7 and $\overline{S0}$–$\overline{S7}$, where the overbar denotes the complement of the unbarred quantity. These adder output bit lines are the true and complement lines for the eight data bits for byte 3.

The parity generator 27 includes parity signal generating circuitry represented by $\overline{P}$ generator 40 for generating both an even indicator signal P and an odd indicator signal $\overline{P}$ for adder output bits S0–S2. The even indicator signal P has a binary value of one if bits S0–S2 contain an even number of ones. The odd indicator signal $\overline{P}$ has a binary value of one if bits S0–S2 contain an odd number of one bits. Thus, the odd indicator signal $\overline{P}$ is the complement of the even indicator signal P.

The parity generator 27 also includes parity signal generating circuitry represented by Q generator 41 for generating both an even indicator signal Q and an odd indicator signsl $\overline{Q}$ for adder output bits S4–S6. The Q generator 41 is of the same internal construction as the P generator 40 and its even and odd output signals Q and $\overline{Q}$ have the same significance with respect to the numbers of one bits in the S4–S6 group.

The parity generator 27 further includes parity signal generating circuitry represented by R generator 42 for generating both even (R) and odd ($\overline{R}$) indicator signals for adder output bits S3 and S7. The internal construction of the R generator 42 is somewhat different from the construction of the P and Q generators 40 and 41.

The even and odd indications produced by P, Q and R generators 40, 41 and 42 are supplied to a ZP generator 43, which, in response thereto, produces the correct odd parity check bit ZP3 for byte 3. This is the check bit supplied to the output register 30 in FIG. 1.

As will be seen, the P generator 40 includes internal control circuitry for inverting its output indications when the hex six field (bits S0–S3) outputs a digit value of either hex A or hex B. Similarly, the Q generator 41 includes internal control circuitry for inverting its output indications when the hex 7 field (bits S4–S7) outputs a digit value of either hex A or hex B. These hex A and hex B values are the two digit field cases where the predicted parties need to be inverted to obtain the correct parities. The R generator 42 includes internal control circuitry for inverting its output indications whenever the sign field included within byte 3 is to be set to the negative-indicating hex D code by the output corrector 23. Inverting the output for a single one of the three generators 40–42 will invert the value of the final parity check bit ZP3. Inverting the outputs of two of the generators 40–42, on the other hand, will offset one another and the final parity check bit ZP3 will not be inverted.

The two stages of delay caused by the parity generator 27 can be seen in FIG. 5. Generators 40–42 represent one stage or one level of delay, while the ZP generator 43 represents a second stage or second level of delay.

Figure 6:
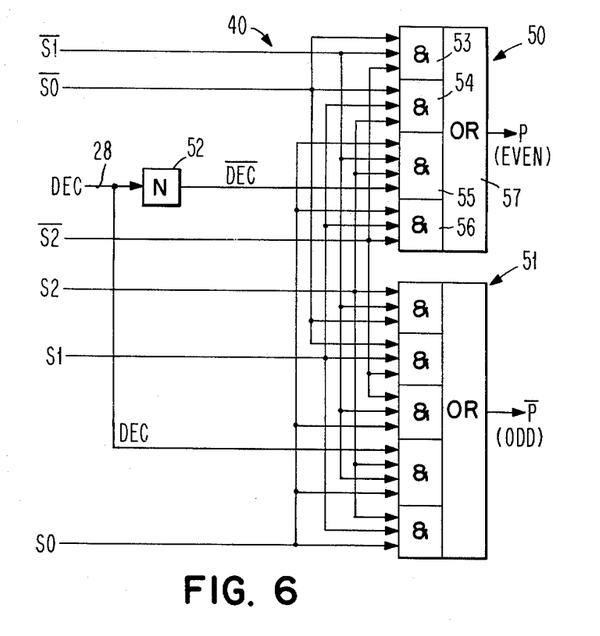
FIG. 6 is a logic circuit diagram showing a representative form of construction for the P generator of FIG. 5.
Figure 7:
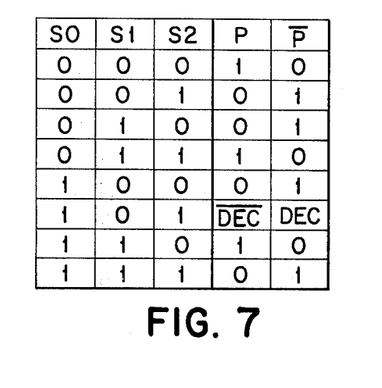
FIG. 7 is a truth table for the P generator of Fig. 6.

Referring now to FIG. 6, there is shown a representative form of internal construction for the P generator 40 of FIG. 5. As seen in FIG. 6, the P generator 40 includes first logic circuitry 50 for generating the even indicator signal P and second logic circuitry 51 for generating the odd indicator signal $\overline{P}$. The P generator 40 also includes control circuitry for controlling the operation of the logic circuits 50 and 51 so as to cause an inverting of the P and $\overline{P}$ indications for adder output digit field values of hex A and hex B. This control circuitry includes the DEC (decimal) control line 28 and a NOT circuit 52. FIG. 7 shows a truth table for the logic circuitry of FIG. 6. Except for the 101 case which occurs for the digit field hex A and hex B values, the even signal P should have a binary 1 value whenever the 3 S0–S2 bits have an even number of ones. In this regard, no ones (000) is considered to be an even number of ones. The odd indicating signal $\overline{P}$, on the other hand, should have a binary value of one when S0–S2 have an odd number of ones excepting, of course, the special 101 case.

Normally, the 101 case should produce a 1 in the P column. This it is allowed to do when processing pure binary data or other nondecimal data. At such time, there is a no-fix condition and $\overline{DEC} = 1$. When adding or subtracting decimal data, on the other hand, the output signals need to be inverted for the 101 case. This is the "fix" condition at which time DEC = 1. In other words, when handling decimal data, the occurrence of a 101 value is caused to produce a 1 in the P column and a zero in the P̄ column.

As can be deduced from the truth table of FIG. 7 by looking down the P column thereof, the even logic circuitry 50 executes the following logical relationship:

$$P = (\overline{S0}.\overline{S1}.\overline{S2}) + (\overline{S0}.S1.S2) + (S0.\overline{S1}.S2.\overline{DEC}) + (S0.S1.\overline{S2}) \quad (1)$$

where the plus (+) symbol denotes the logical OR function and the dot (·) symbol denotes the logical AND function. AND circuit 53 provides the first term in Equation (1), AND circuit 54 provides the second term, AND circuit 55 provides the third term and AND circuit 56 provides the fourth term. OR circuit 57 provides the ORing action.

As can also be deduced from the truth table of FIG. 7 by looking down the P̄ column thereof, the odd logic circuitry 51 executes the following logical relationship:

$$\overline{P} = (\overline{S0}.\overline{S1}.S2) + (\overline{S0}.S1.\overline{S2}) + (S0.\overline{S1}.\overline{S2}) + (S0.\overline{S1}.S2.DEC) + (S0.S1.S2) \quad (2)$$

The decimal status control line 28 will be at the binary one level if the decimal status signal on line 28 indicates that a decimal operation is being performed (DEC = 1). Otherwise, the decimal control line 28 will be at the binary zero level. The $\overline{DEC}$ signal at the output of NOT circuit 52 is the complement of the DEC signal on control line 28. Thus, the $\overline{DEC}$ signal will be at the binary one level unless the status is decimal (DEC = 1). When DEC = 1, a 101 for bits S0–S2 will produce a one on the P̄ output line for the odd logic circuitry 51. When, on the other hand, $\overline{DEC}$ = 1, the occurrence of a 101 for bits S0–S2 will produce a one at the P output of the even logic circuitry 50.

As mentioned, the Q generator 41 is of the same internal construction as that just described for the P generator 40. The Q generator 41 does, of course, receive different bit signals (S4–S6).

Figure 8:
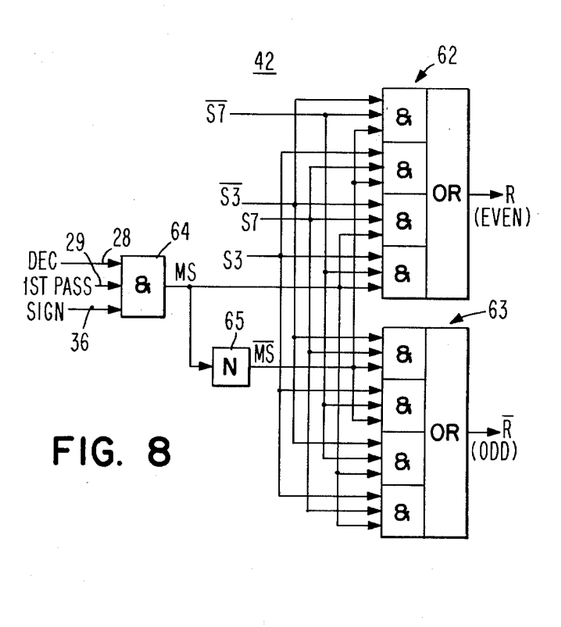
FIG. 8 is a logic circuit diagram showing a representative form of construction for the R generator of FIG. 5.

Referring now to FIG. 8, there is shown a representative form of internal construction for the R generator 42 of FIG. 5. As seen in FIG. 8, the R generator 42 includes first logic circuitry 62 for generating an even indicator signal R and second logic circuitry 63 for generating an odd indicator signal R̄. The R generator 42 further includes control circuitry which includes an AND circuit 64 and a NOT circuit 65 for inverting the R and R̄ indications whenever the output corrector 23 is outputting a decimal sign field and the coding of such sign field indicates a negative sign value. This negative sign field case is detected by the AND circuit 64 which produces an output signal MS, where MS denotes "minus sign." The MS signal is at the binary one level when the format status is decimal (DEC = 1), the operation status is first pass (1st PASS = 1) and the sign status is negative (SIGN = 1). Otherwise, the MS signal is at the binary zero level. The first pass status is considered because, as mentioned, a decimal sign field occurs only during a first pass operation. During subsequent passes, it is replaced by either a zone field or a digit field, depending upon whether the format is zoned or packed.

Figure 9:
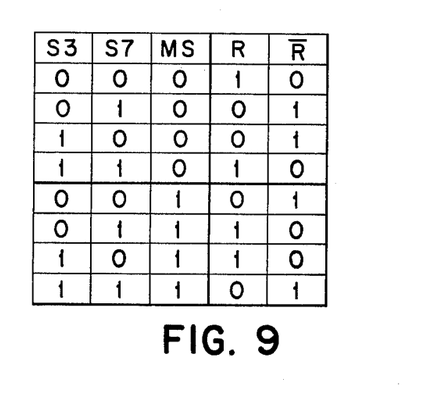
FIG. 9 is a truth table for the R generator of FIG. 8.

The truth table for the logic circuitry of FIG. 8 is shown in FIG. 9. It is interesting to note how the minus sign signal MS functions to invert the R and R̄ outputs for the occurrence of a negative sign field code. The upper four entries in the truth table represent the positive sign and the "no sign" cases, in which event MS = 0. The lower four entries represent the occurrence of a minus sign (MS = 1) and, as can be seen by comparing the lower four R values with the upper four R values, the R output is indeed inverted for the occurrence of a minus sign. Likewise, the R̄ output is also inverted.

As can be deduced from the truth table of FIG. 9, the even logic circuitry 62 executes the following logical relationship:

$$R = (\overline{S3}.\overline{S7}.\overline{MS}) + (S3.S7.\overline{MS}) + (\overline{S3}.S7.MS) + (S3.\overline{S7}.MS) \quad (3)$$

Similarly, the odd logic circuitry 63 executes the following logical relationship:

$$\overline{R} = (\overline{S3}.S7.\overline{MS}) + (S3.\overline{S7}.\overline{MS}) + (\overline{S3}.\overline{S7}.MS) + (S3.S7.MS) \quad (4)$$

Figure 10:
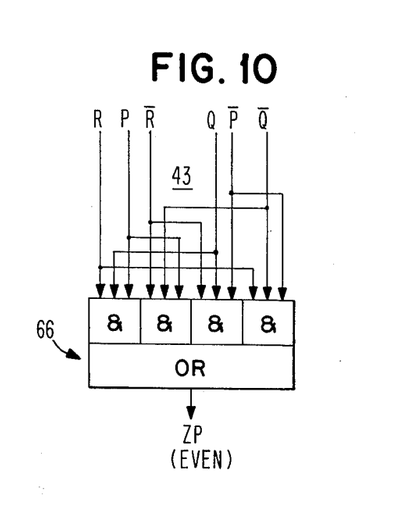
FIG. 10 is a logic circuit diagram for the ZP generator of FIG. 5.
Figure 11:
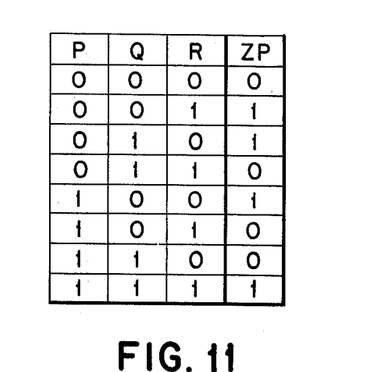
FIG. 11 is a truth table for the ZP generator of FIG. 10.

Referring now to FIG. 10, there is shown a representative form of internal construction for the ZP generator 43 of FIG. 5. As indicated in FIG. 10, the ZP generator 43 includes logic circuitry 66 responsive to the true and complement P, Q and R signals from P, Q and R generators 40, 41 and 42 for producing the ultimate odd parity check bit ZP3 for byte 3. The truth table for the logic circuitry 66 is shown in FIG. 11. As can be seen from such truth table, the logic circuitry 66 executes the following logical relationship:

$$ZP = (\overline{P}.\overline{Q}.R) + (\overline{P}.Q.\overline{R}) + (P.\overline{Q}.\overline{R}) + (P.Q.R) \quad (5)$$

The logical circuitry 66 performs something analogous to an algebraic combination for the three odd/even factors provided by the P, Q and R generators 40, 41 and 42. If all three of the P, Q and R factors are even, then the output is even (ZP = 1). If two are even and one is odd, then the output is odd (ZP = 0). If, on the other hand, one factor is even and the other two factors are odd, then the two odds combine to make an even, thus causing the final output to be even (ZP = 1). If all three factors are odd, then the output is odd (ZP = 0).

Neglecting the special cases where one or more of the P, Q and R signals are inverted by the external control signals, the occurrence of a binary 1 value at the output of ZP generator 43 (ZP = 1) indicates that the 8 data bits S0–S7 contain an even number of 1's. In such case, the parity check bit ZP3 should also be a binary 1 value so that the combination of data bits plus check bit will have an odd number of 1's. Conversely, and again ignoring the special cases, the ocurrence of a binary zero level at the output of the ZP generator 43 indicates that the 8 data bits S0–S7 have an odd number of ones. In such case, the parity check bit ZP3 should, of course, have a binary value of zero.

If the data processor in which the arithmetic unit 10 is used employs even parity checking instead of odd parity checking, then the parity generator 27 can be readily modified to provide a parity check bit which, when combined with the 8 data bits, provides even parity. This is done by modifying the connections inside the ZP generator 43 so that the ZP generator 43 will output a $\overline{ZP}$ signal instead of a ZP signal. In other words, the ZP logic is complemented or inverted.

The internal construction of the other three parity generators 24–26 for the other bytes 0, 1 and 2 may be exactly the same as the internal construction for the byte 3 parity generator 27 just considered except that the inverting action provided by the control circuitry inside the R generator 42 is either disabled or omitted.

This is done because a decimal sign field never occurs in any of the byte 0, 1 and 2 positions. Hence, there is no need for the sign controlled inverting action. With reference to FIG. 8, the easiest way of accomplishing this R generator modification would be to permanently set one or more of the three input lines 28, 29 and 36 running to the AND circuit 64 at the binary zero level. This would permanently set the MS signal to zero and would permanently disable any externally controlled inverting action in the R generator 42. Should economy dictate, the R generator 42 could instead be reconstructed to execute only the upper half of the FIG. 9 truth table, with the MS column omitted. This would reduce the even and odd logic circuits 62 and 63 to the point where each would need only two two-input AND circuits. Also, of course, the AND circuit 64 and the NOT circuit 65 would be omitted.

Figure 12:
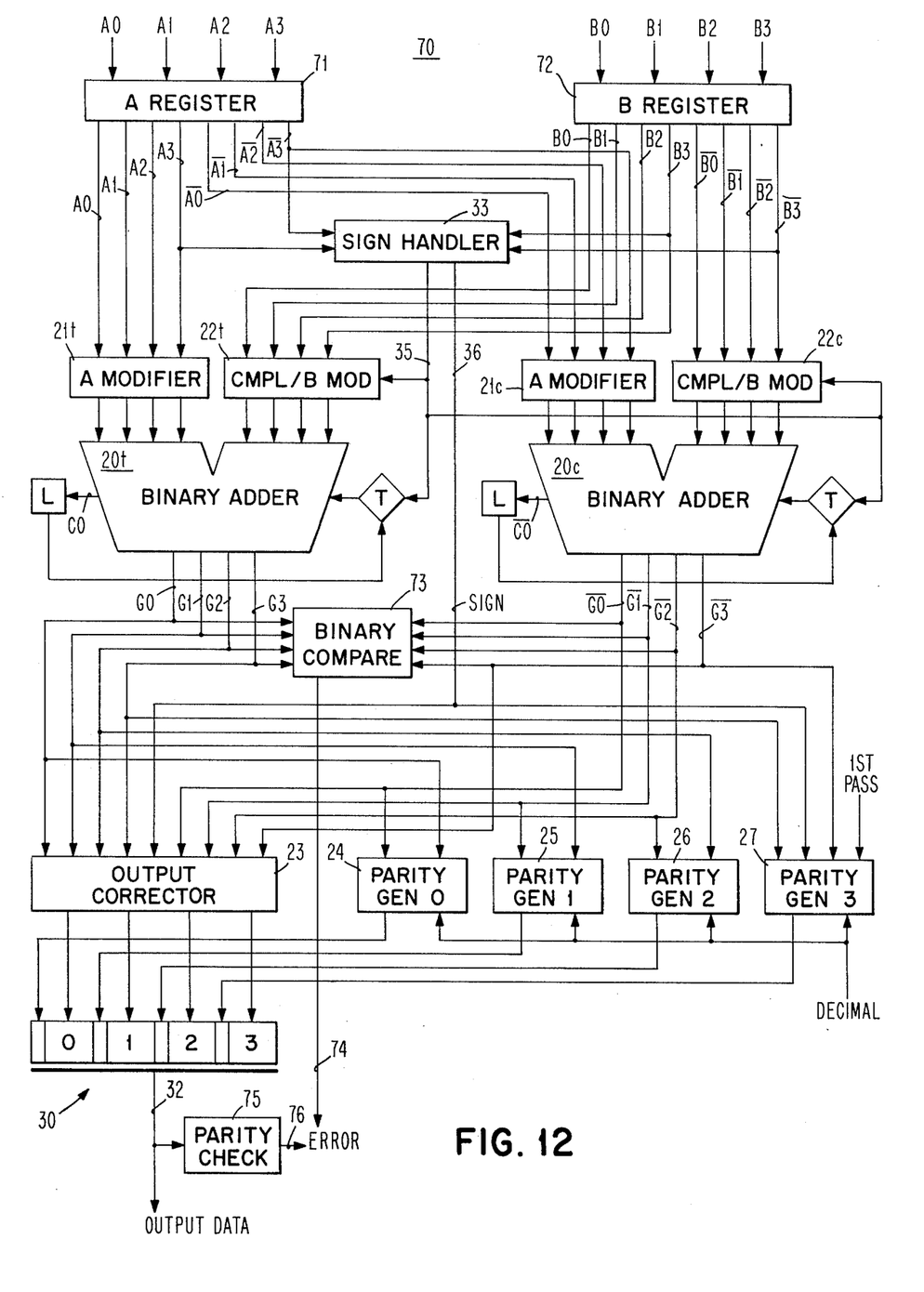
FIG. 12 is a functional block diagram of a further embodiment of an arithmetic unit having parity check bit generation and error detection features in accordance with the teachings of the present invention.

Referring now to FIG. 12, there is shown another embodiment of an arithmetic unit, designated as arithmetic unit 70, constructed in accordance with the present invention. The arithmetic unit 70 includes all the features of the arithmetic unit 10 of FIG. 1 plus additional and further advantageous features. For sake of comparison, elements or units shown in FIG. 12 which are the same or substantially the same as shown in FIG. 1 are given the same reference numerals as used in FIG. 1. In particular, the output corrector 23, the parity generators 24–27, the output register 30 and the sign handler 33 are either the same as or differ only in very minor respects from the corresponding items shown in FIG. 1.

A major point of difference for the arithmetic unit 70 is that it includes a pair of 32 bit parallel binary adders 20$t$ and 20$c$ in place of the single binary adder 20 of FIG. 1. Also, the adder 20$t$ has its own A input modifier 21$t$ and its own complement and B input modifier 22$t$. Likewise, the second binary adder 20$c$ has its own A input modifier 21$c$ and its own complement and B input modifier 22$c$. Each of the two A input modifiers 21$t$ and 21$c$ are of the same internal construction and operate in the same manner as the A input modifier 21 of FIG. 1. Likewise, each of the two complement and B input modifiers 22$t$ and 22$c$ have the same internal construction and operate in the same manner as the complement and B input modifier 22 of FIG. 1.

The use of two binary adders and two sets of input modifiers in the arithmetic unit 70 provides improved reliability, improved error checking and improved processing speed.

In the arithmetic unit 70, the four A side input data bytes A0–A3 are supplied to a 32 stage A register 71. The A register 71 has both true and complement output lines. The true output lines are grouped into four eightconductor data buses A0–A3 which run to the A input modifier 21$t$ for the first adder 20$t$. The complement output lines are grouped into four eight-conductor data buses $\overline{A0}$–$\overline{A3}$ which run to the A input modifier 21$c$ associated with the second binary adder 20$c$.

In a similar manner, the four B side input data bytes B0–B3 are supplied to a 32 stage B register 72. Register 72 also has true and complement output lines. The true output lines are grouped into four eightconductor data buses B0–B3 which run to the B input modifier 22$t$ associated with the first adder 20$t$. The complement output lines are grouped into four eightconductor data buses $\overline{B0}$–$\overline{B3}$ which run to the B input modifier 22$c$ associated with the second adder 20$c$.

The first adder 20$t$ and its input modifiers 21$t$ and 22$t$ operate in the same manner as described in FIG. 1 to produce at the output of the adder 20$t$ four 8 bit data bytes $\overline{G0}$–$\overline{G3}$ which are in true form. The second adder 20$c$ and its input modifiers 21$c$ and 22$c$ also operate in the same manner as described in FIG. 1, but in this case the four output data bytes G0–G3 are in complement form. This is because the inputs to the A and B input modifiers 21$c$ and 22$c$ were in complement form. Thus, the data bit sequence appearing at the output of the second adder 20$c$ is the complement of the data bit sequence appearing at the output of the first adder 20$t$.

As a first error checking feature, the true form data bit sequence from adder 20$t$ is compared with the complement form data bit sequence from the adder 20$c$ on a bit for bit basis inside a binary comparator 73. If the complement form data bit sequence is not precisely the complement of the true form data bit sequence, then an error signal is produced on comparator output line 74. In such event, the appropriate error handling procedures can be instituted. If no error is indicated by the comparator 73, the data processor continues its normal operation. With respect to its internal construction, the binary comparator 73 may include, for example, a set of 32 EXCLUSIVE OR circuits for exclusive ORing each true form data bit with its corresponding complement form data bit. The outputs of these EXCLUSIVE OR circuits are ANDed together and the ANDed result inverted to provide the error indicating signal for output line 74. The use of the comparator 73 ensures to an extremely high degree of probability that the data appearing at the outputs of adders 20$t$ and 20$c$ is error free. More accurately, the use of the comparator 73 ensures that no errors are introduced by the input modifiers 21$t$, 22$t$, 21$c$ and 22$c$ and adders 20$t$ and 20$c$.

The output corrector 23 and the parity generators 24–27 operate in the same manner as previously considered. The use of the second adder 20$c$ improves the overall speed of operation in that the complement form data bytes $\overline{G0}$–$\overline{G3}$ are made available at the same instant that the true form data bytes G0–G3 become available. No delay is introduced because of a need to invert the true form data bytes to get the complement form data bytes.

As a further error checking feature, a parity checker 75 may be connected to the 36-conductor output data bus 32 of the output register 30 for purposes of checking the parities of the bytes in the final output data and producing on a parity checker output line 76 an error signal in the event of any byte parity errors. This provides a check on the operation of the output corrector 23, the parity generators 24–27 and the output register 30. Various forms of internal construction for parity checkers are known in the art and, hence, such internal construction need not be discussed herein.

The use of the parity prediction provided by the parity generators 24–27, in addition to improving the operating speed, also, as just mentioned, provides a check on the accuracy of operation of the output corrector 23. Without this parity prediction, there would be no way of checking the output corrector 23.

For simplicity of illustration, the hex field carryout lines C0–C7 for the adder 20$t$ have been omitted from the drawing of FIG. 12. It is to be understood, however, that these carry-out lines C0–C7 are, in fact, present and do run to the output corrector 23 in the same manner as shown in FIG. 1.

As a closing comment, it is noted that the embodiments of the invention described hereinabove were explained primarily in terms of circuit combinations employing positive logic. This was deliberately done to simplify an understanding of the basic concepts. It should be understood, however, that such embodiments can also be explained in terms of circuit combinations employing negative logic or a mixture of positive and negative logic. It is further noted that the representative forms of construction for the logic circuitry described hereinabove were implemented by means of AND, OR and NOT circuits. This was also done to simplify the understanding process. It should be understood, however, that such circuitry can also be implemented in whole or in part by means of NAND circuits or NOR circuits or other forms of logic circuitry.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. An arithmetic unit for a digital data processor comprising:
    binary arithmetic circuitry for arithmetically combining two binary data bit sequences;
    modifier circuitry for receiving the resultant data bit sequence produced by the arithmetic circuitry and modifying the bits therein, where necessary, to obtain a desired result;
    parity check bit generating circuitry having data bit inputs coupled only to the data bit outputs of the arithmetic circuitry and responsive to the entire resultant unmodified data bit sequence produced by the arithmetic circuitry for generating at least one parity check bit;
    and assembler circuitry for concatenating the modified data bit sequence produced by the modifier circuitry with the parity check bit produced by the parity check bit generating circuitry.

2. An arithmetic unit for a digital data processor comprising:
    binary arithmetic circuitry for arithmetically combining two binary bit sequences;
    input preconditioning circuitry for receiving two data bit sequences, preconditioning same and supplying the preconditioned data bit sequences to the two input sides of the arithmetic circuitry;
    output correction circuitry for receiving the resultant data bit sequence produced by the arithmetic circuitry and correcting the bits therein, where necessary, to offset any undesired effects introduced by the preconditioning and arithmetic combining operations;
    parity check bit generating circuitry coupled to the output side of the arithmetic circuitry and responsive to the entire resultant uncorrected data bit sequence produced by the arithmetic circuitry for generating at least one parity check bit;
    and assembler circuitry for concatenating the corrected data bit sequence produced by the output correction circuitry with the parity check bit produced by the parity check bit generating circuitry.

3. An arithmetic unit in accordance with claim 2 wherein the binary arithmetic circuitry is a parallel binary adder for adding two binary bit sequences.

4. An arithmetic unit in accordance with claim 2 wherein the binary arithmetic circuitry is a parallel binary subtractor for subtracting two binary bit sequences.

5. An arithmetic unit in accordance with claim 2 wherein the assembler circuitry is comprised of a binary register having a number of side-by-side binary bit stages for receiving binary bits in a parallel manner and wherein the corrected data bit sequence is supplied to a contiguous group of the register bit stages and the parity check bit is supplied to a neighboring register bit stage.

6. An arithmetic unit in accordance with claim 2 wherein the parity check bit generating circuitry also includes control circuitry responsive to the occurrence of at least one control signal for inverting the binary value of the parity check bit for at least one predetermined binary code combination for the resultant uncorrected data bit sequence produced by the arithmetic circuitry.

7. An arithmetic unit in accordance with claim 2 wherein:
    the two data bit sequences received by the input preconditioning circuitry are plural byte data bit sequences;
    the binary arithmetic circuitry produces a resultant plural byte data bit sequence;
    the parity check bit generating circuitry generates one parity check bit for each byte appearing at the output of the arithmetic circuitry;
    and the assembler circuitry concatenates the corrected data bytes with the generated parity check bits, each check bit being assembled adjacent its corresponding data byte.

8. An arithmetic unit in accordance with claim 7 wherein the parity check bit generating circuitry includes:
    a first parity check bit generator coupled to the arithmetic circuitry and responsive to the resultant uncorrected data bits for a first data byte for generating a parity check bit for such first resultant data byte;
    and a second parity check bit generator coupled to the arithmetic circuitry and responsive to the resultant uncorrected data bits for a second data byte for generating a parity check bit for such second resultant data byte.

9. An arithmetic unit in accordance with claim 8 wherein:
    the first parity check bit generator includes control circuitry for inverting the binary value of the first parity check bit for at least one predetermined binary code combination for the uncorrected data bits in the first data byte;
    and the second parity check bit generator includes control circuitry for inverting the binary value of the second parity check bit for at least one predetermined binary code combination for the uncorrected data bits in the second data byte.

10. Controllable parity signal generating circuitry comprising:
    first logic circuitry responsive to a group of data bits for generating an even parity indication;
    second logic circuitry responsive to the same group of data bits for generating an odd parity indication;

and control circuitry responsive to the occurrence of at least one control signal for modifying the operation of the first and second logic circuitry for causing such circuitry to invert the even and odd parity indications for at least one predetermined binary code combination for the group of data bits being considered.

11. An arithmetic unit for a digital data processor comprising:

first binary arithmetic circuitry for arithmetically combining a first pair of binary data bit sequences;

second binary arithmetic circuitry for arithmetically combining a second pair of binary data bit sequences which constitute the complements of the first pair of binary data bit sequences;

comparator circuitry for comparing the resultant data bit sequences produced by the first and second arithmetic circuitry and producing an output error signal if one of these data bit sequences is not the exact complement of the other;

modifier circuitry for receiving the resultant data bit sequences produced by the first and second arithmetic circuitry and producing an output data bit sequence representing the correct result of the arithmetic operation performed on the first pair of binary data bit sequences;

parity check bit generating circuitry responsive to the resultant unmodified data bit sequences produced by the first and second arithmetic circuitry for generating at least one parity check bit;

and assembler circuitry for concatenating the output data bit sequence produced by the modifier circuitry with the parity check bit produced by the parity check bit generating circuitry.

* * * * *

UNITED STATES PATENT OFFICE
CERTIFICATE OF CORRECTION

PATENT NO. : 3,986,015

DATED : October 12, 1976

INVENTOR(S) : David N. Gooding and Everett M. Shimp

It is certified that error appears in the above-identified patent and that said Letters Patent are hereby corrected as shown below:

Column 3, line 40, "A 9 bit," should read --A ninth bit,--; line 44, after "only" insert --the--. Column 7, line 65, "example, he" should read --example, the--. Column 11, line 56, "P" should read --P--; line 58, "P" should read --$\bar{P}$--; line 68, "signsl" should read --signal--. Column 12, line 24, "parties" should read --parities--. Column 13, line 1, "P" should read --$\bar{P}$--; line 48, "R and R" should read --R and $\bar{R}$--. Column 14, line 15, the logical relationship "$R = (\overline{S3} \cdot S7 \cdot \overline{MS}) + (S3 \cdot \overline{S7} \cdot \overline{MS}) + (\overline{S3} \cdot \overline{S7} \cdot MS) + (S3 \cdot S7 \cdot MS)$   (4)"

should read

--$\bar{R} = (\overline{S3} \cdot S7 \cdot \overline{MS}) + (S3 \cdot \overline{S7} \cdot \overline{MS}) + (\overline{S3} \cdot \overline{S7} \cdot MS) + (S3 \cdot S7 \cdot MS)$   (4)--

Column 15, line 55, "eightconductor" should read --eight-conductor--; line 63, "eightconductor" should read --eight-conductor--; line 66, "eightconductor" should read --eight-conductor--. Column 16, line 4, "$\overline{G0}$-$\overline{G3}$" should read --G0-G3--; line 7, "G0-G3" should read --$\overline{G0}$-$\overline{G3}$--.

Signed and Sealed this twelfth Day of July 1977

[SEAL]

Attest:

RUTH C. MASON
Attesting Officer

C. MARSHALL DANN
Commissioner of Patents and Trademarks